United States Patent [19]
McDunn et al.

[11] Patent Number: 5,841,564
[45] Date of Patent: Nov. 24, 1998

[54] APPARATUS FOR COMMUNICATION BY AN ELECTRONIC DEVICE AND METHOD FOR COMMUNICATING BETWEEN ELECTRONIC DEVICES

[75] Inventors: Kevin J. McDunn, Lake In The Hills; Gerald W. Ballard, West Dundee, both of Ill.

[73] Assignee: Motorola, Inc., Schaumburg, Ill.

[21] Appl. No.: 775,663

[22] Filed: Dec. 31, 1996

[51] Int. Cl.$^6$ .................................................. H04B 10/00
[52] U.S. Cl. ........................................... 359/161; 361/752
[58] Field of Search ..................................... 359/161, 152, 359/159, 162, 163, 142, 143; 385/88, 90, 92, 93; 361/752

[56] References Cited

U.S. PATENT DOCUMENTS

| | | | |
|---|---|---|---|
| 5,289,345 | 2/1994 | Corradetti et al. | 361/752 |
| 5,561,727 | 10/1996 | Akila et al. | 385/88 |
| 5,596,664 | 1/1997 | Bastica et al. | 385/29 |
| 5,668,654 | 9/1997 | Benjamin et al. | 359/152 |

*Primary Examiner*—Rafael Bacares
*Attorney, Agent, or Firm*—Heather L. Creps

[57] ABSTRACT

The apparatus includes a first housing (10) defining a first chamber (26), the first chamber sized to enclose an electronic device. The first housing has an inner surface (22) and an outer surface (24), and at least a portion of the first housing is transparent. A light-generating device (14) is disposed at least in part between the inner surface and the outer surface of the transparent portion of the first housing. The light-generating device has a first end and a second end. The first end is responsive to electrical signals (18) and the second end is responsive to optical signals (20). When a first electronic device (45) is disposed in the first chamber, the first electronic device transmits electrical signals to the first end, the second end translates the electrical signals to optical signals and transmits the optical signals through the outer surface.

14 Claims, 5 Drawing Sheets

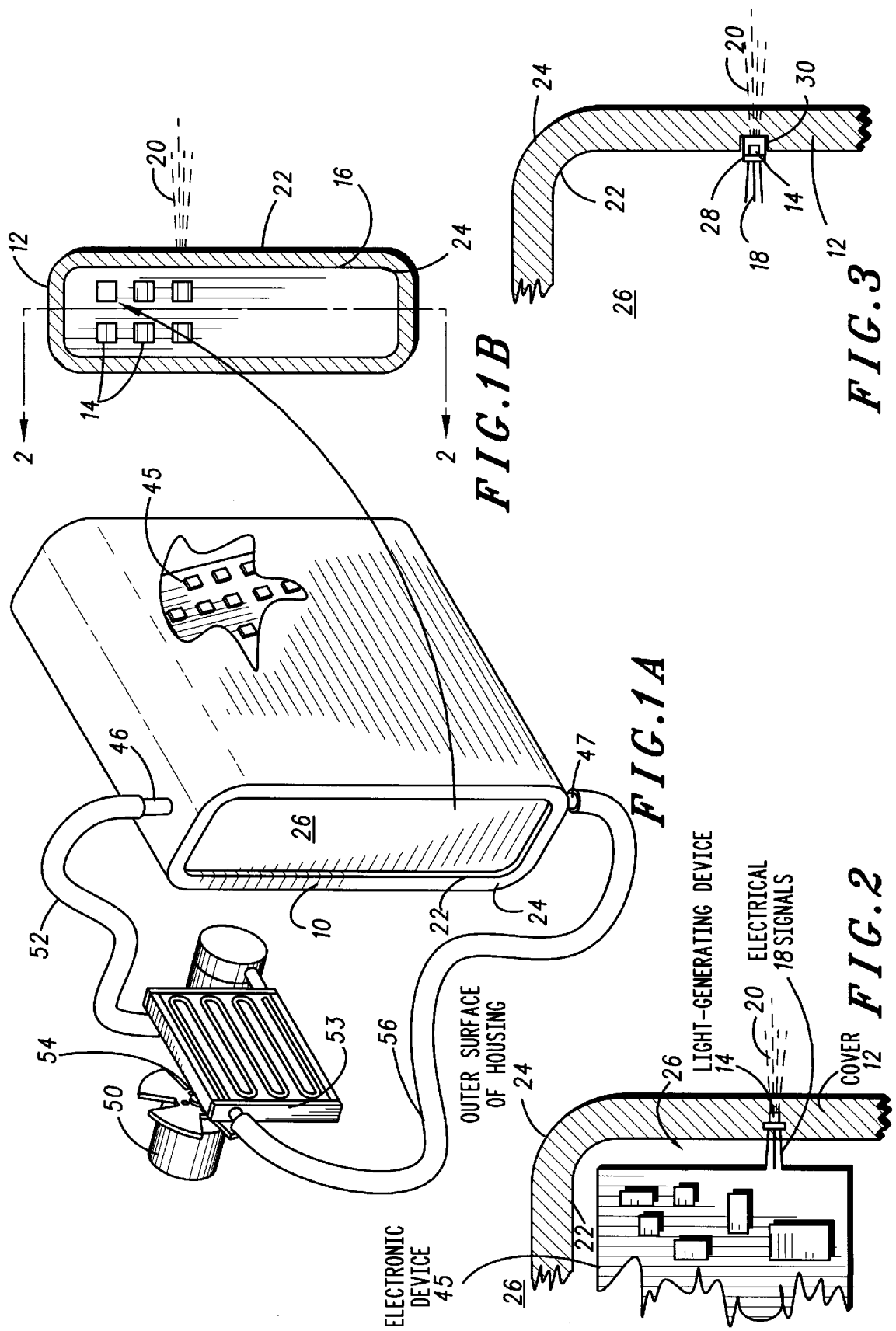

APPARATUS FOR COMMUNICATION BY AN ELECTRONIC DEVICE AND METHOD FOR COMMUNICATING BETWEEN ELECTRONIC DEVICES

FIELD OF THE INVENTION

This invention relates generally to interconnections between electronic devices, and, more particularly, to an apparatus for communication by an electronic device and to a method for communication between electronic devices.

BACKGROUND OF THE INVENTION

Electronic devices such as printed circuit boards, multi-chip modules and electronic hybrid assemblies, as well as various component-level devices such as integrated circuits, passive components and active components, may be heat sources which require cooling during normal operation.

Two-phase spray cooling features the spraying of atomized fluid droplets directly or indirectly onto a surface of a heat source such as an electronic device. When the fluid droplets impinge upon the device's surface, a thin film of liquid coats the device, and heat is removed primarily by evaporation of the fluid from the device's surface.

Although two-phase spray-cooling is a preferred method of heat removal in many applications, housings which enclose a spray-cooled device typically require extensive sealing. Generally, a housing should have a maximum leak rate of $10^{-6}$ cubic centimeters per second at 1 atmosphere pressure difference, so as to maintain enough fluid for proper system performance over five years.

One advantage of spray-cooling is the high level of integration which may be achieved in electronic systems. As systems become more integrated, however, interconnections required for communication between electronic devices are often numerous and complex, and conventional methods for interconnecting electronic devices, such as physical mating of electrical conductors or optical fibers, may not adequately prevent fluid loss in a spray-cooled system—every physical, electric or fiber optic feedthrough which traverses an exterior boundary of a housing may contribute to fluid loss over time.

While hermetically sealing connectors to prevent excessive fluid loss is possible, such sealing may be prohibitively costly and may involve the assembly of many parts such as seals, lock nuts and clamps.

There is therefore a need for an apparatus and a method for communication by and between electronic devices which does not result in excessive fluid loss across a sealed boundary and which does not require extensive hermetic sealing.

SUMMARY OF THE INVENTION

According to an aspect of the present invention, the foregoing needs are addressed by an apparatus for communication by an electronic device which includes a first housing defining a first chamber, the first chamber sized to enclose an electronic device. The first housing has an inner surface and an outer surface, and at least a portion of the first housing is transparent. A light-generating device is disposed at least in part between the inner surface and the outer surface of the transparent portion of the first housing. The light-generating device has a first end and a second end. The first end is responsive to electrical signals and the second end is responsive to optical signals. When a first electronic device is disposed in the first chamber, the first electronic device transmits electrical signals to the first end, and the second end translates the electrical signals to optical signals and transmits the optical signals through the outer surface.

According to another aspect of the present invention, a method for communicating between electronic devices includes providing a housing defining a chamber, the housing having an inner surface and an outer surface, at least a portion of the housing being transparent; disposing a first electronic device and a second electronic device in the chamber; disposing a light-generating device at least partially between the inner surface and the outer surface of the transparent portion of the housing, the light-generating device having a first end and a second end, the first end responsive to electrical signals and the second end responsive to optical signals; providing an interface board responsive to the light-generating device, the interface board in communication with the transparent portion of the housing; transmitting, by the first electronic device, electrical signals to the first end; translating the electrical signals to optical signals; transmitting the optical signals through the outer surface to the interface board; and communicating via the interface board with the second electronic device.

According to a further aspect of the present invention, a method for communicating between electronic devices includes providing a first housing defining a first chamber, the first housing having an inner surface and an outer surface, at least a portion of the first housing being transparent; disposing a first electronic device in the first chamber; disposing a light-generating device at least partially between the inner surface and the outer surface of the transparent portion of the first housing, the light-generating device having a first end and a second end, the first end responsive to electrical signals and the second end responsive to optical signals; providing a second housing defining a second chamber, at least a portion of the second housing being transparent; disposing a second electronic device in the second chamber; and communicating, via the light-generating device, between the first and second electronic devices.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

BRIEF DESCRIPTION OF THE DRAWINGS

FIG. 1 is a perspective view of a fluid-sealed housing having a light-generating device embedded therein, according to a preferred embodiment of the present invention.

FIG. 2 is a cross-sectional view of FIG. 1, along line 2—2, illustrating one way of embedding the light-generating device in the housing.

FIG. 3 illustrates a first alternate way of embedding the light-generating device in the housing shown in FIG. 1.

DETAILED DESCRIPTION OF THE PREFERRED EMBODIMENTS

Figure 4:
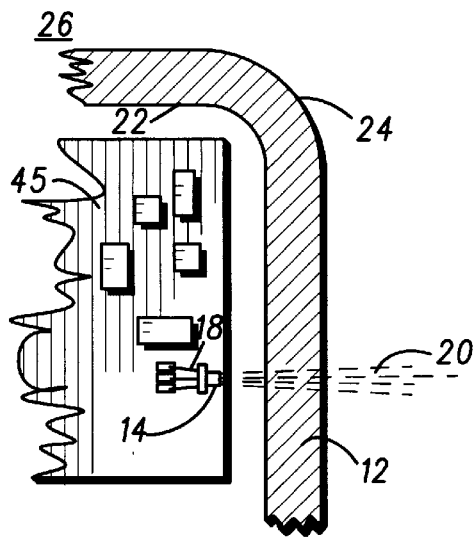
FIG. 4 illustrates a second alternate way of positioning the light-generating device in the housing shown in FIG. 1.

Turning now to the drawings, wherein like numerals designate like components, FIG. 1 is a perspective view of a fluid-sealed housing 10. Housing 10 is preferably plastic, but may be another suitable material such as metal. As shown, housing 10 has in interior surface 22 and an exterior surface 24, and encloses within a chamber 26 an electronic device 45 such as a printed circuit board. Housing 10 is preferably configured to cool electronic device 45 using a typical spray-cooling system.

A closed-loop spray-cooling system suitable for spray-cooling electronic module 45 may include a fluid pump 50, which is connected via tube 52 to a fluid inlet port 46, and which supplies a coolant fluid to housing 10. Tube 52 may be coupled to fluid inlet port 46 using a barbed fitting 53, or by any other suitable means.

Nozzles (not shown) atomize the coolant fluid according to well-known techniques and discharge an atomized fluid into cavity 26 and onto electronic device 45. When atomized fluid impinges upon electronic device 45, a thin liquid film coats device 45, and heat is removed primarily by evaporation of fluid from the device.

Excess fluid may be collected and removed from housing 10 by fluid outlet port 47. A condenser 53, connected to pump 50 by tube 54 and to fluid outlet port 47 by tube 56, receives fluid from fluid outlet port 47. Tube 56 may be coupled to fluid outlet port 47 using a barbed fitting, for example, or by any other suitable means. Condenser 53 rejects heat from the fluid, returning it to primarily a liquid phase. A fan (not shown) may be used to extend the cooling capacity of condenser 53. Cooled fluid is supplied from condenser 53 to pump 50. Thus, a closed-loop flow of coolant is formed. It will be appreciated that at any given point the coolant may be a vapor, a liquid or a vapor and liquid mixture.

The coolant fluid may be any dielectric coolant, such coolants being well-known and widely available, or in certain applications may be a conductive coolant such as water. One example of a suitable coolant is 3M's Fluorinert™ dielectric fluid, available from 3M, order number FC-72. Another perfluorocarbon fluid similar to 3M's Fluorinert™ dielectric fluid is available from Ausimont Galden®.

It is contemplated that any conventional means for providing flow of a coolant may be used in conjunction with the described embodiments of the present invention, and that more than one housing 10 may be connected to a single source of coolant or that one or more sources of coolant may be connected to a single housing 10, for example, for redundancy purposes. To further reduce fluid leakage, it is contemplated that the pump and condenser assembly may be integrated within housing 10 such that there are no fluid feedthroughs extending beyond the boundary of housing 10.

Sizes of fluid pump 50 and condenser 53 may be selected based on heat removal and flow rate requirements. For example, a typical closed-loop fluid flow is 500 to 1000 milliliters per minute for 500 to 1000 Watts of heat dissipation. Pump and condenser assemblies in various sizes are available from Isothermal Systems Research, Inc., and acceptable tubing and fittings may be obtained from Cole-Parmer in Vernon Hills, Ill.

Referring again to FIG. 1, housing 10 has a cover 12 which is transparent in at least one area. Cover 12, like housing 10, has an interior surface 22 and an exterior surface 24. Cover 12 may be a material such as an optical-grade polycarbonate which is transparent at predetermined operating wavelengths, or another type of optically transparent material. A suitable material for cover 12 is a molded polymer such as Lexan™ polycarbonate, available from GE Plastics. Cover 12 may be attached and sealed to housing 10 using a gasket 16 such as an o-ring. Numerous methods for sealing or fastening cover 12 to housing 10 may be used, however, such as screws, ultrasonic welding, brazing or soldering, along with other well-known methods.

Cover 12 has a number of light-generating devices 14 embedded therein. Light-generating devices 14 allow electronic device 45 to communicate with electronic devices external to housing 10. Electrical signals appearing at electrical conductor leads (discussed further below) associated with electronic device 45 are sent to light-generating device 14, which excites a light source and translates the electrical signals into optical signals 20. Optical signals 20 are transmitted through cover 12 to a light-receiving device (not shown). Light-receiving devices may also be disposed in cover 12 to allow for two-way communication by electronic device 45.

Light-generating devices 14 may be, for example, semiconductor laser devices such as laser diodes having optical driver circuitry, or may be other devices which convert electrical signals to optical signals. One suitable light-generating device is commercially available from BCP, Inc. Suitable light-receiving devices are also commercially available from BCP, Inc.

FIG. 2 is a cross-sectional view of FIG. 1 along line 2—2, illustrating one way of embedding a light-generating device 14 in cover 12. As shown, light-generating device 14 is disposed entirely between interior surface 22 and exterior surface 24 of cover 12. Insertion molding is a preferred method of embedding light-generating device 14 in cover 12, although other methods are possible. Electrical conductor leads 18 associated with electronic device 45 may also be insertion-molded into interior surface 22 of cover 12, possibly when light-generating device 14 is insertion-molded into cover 12. Alternatively, electrical conductor termination may be accomplished using an over-molded flex circuit according to well-known techniques.

It can be seen that embedding light-generating device 14 in cover 12 as illustrated in FIG. 2 allows coolant fluid used to cool electronic device 45 to be conserved in chamber 26 and also allows optical signals 20 to pass freely and undistorted by the coolant fluid out of sealed housing 10. Minimizing distortion from coolant fluid may be important in applications involving high data rates, for example. In addition, cover 12 may serve an a focusing element for optical signals generated by light-generating device 14.

FIG. 3 illustrates a first alternate way of embedding a light-generating device 14 in cover 12. As shown, a recess 30 is formed in interior surface 22 of cover 12. A lens 28, which encapsulates light-generating device 14, fits tightly into recess 30. This configuration may be useful in applications where fluid interference with transmission of optical signals 20 is less of a concern, for example, where low data rates are involved.

FIG. 4 illustrates a second alternate way of positioning a light-generating device in housing 10. As shown, light-generating device 14 is disposed on electronic device 45, so that optical signals 20 are transmitted through both interior surface 22 and exterior surface 24 of cover 12.

Figure 5:
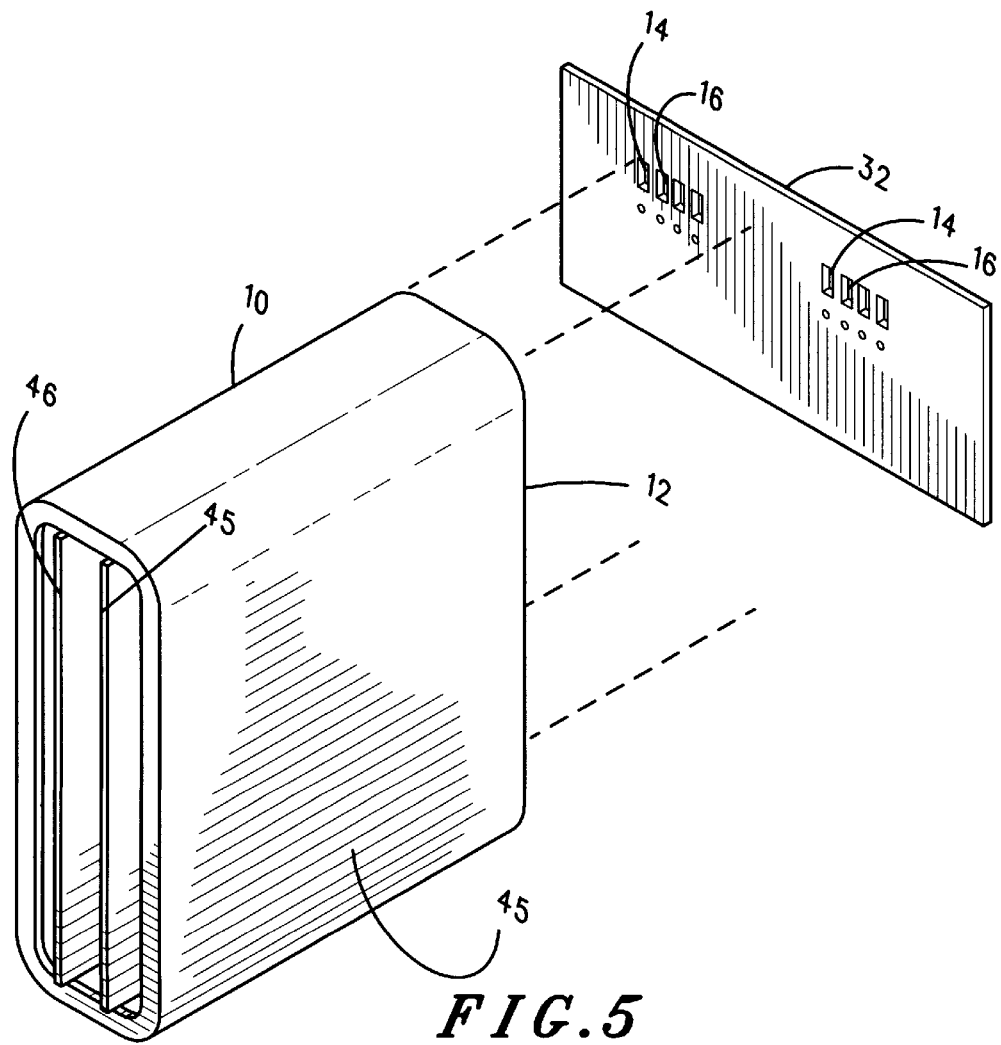
FIG. 5 is a perspective view of a fluid-sealed housing enclosing electronic devices which are interconnected by a central interface, according to a preferred embodiment of the present invention.

FIG. 5 is a perspective view of housing 10, enclosing a first spray-cooled electronic device 45 and a second spray-cooled electronic device 46. Housing 10 has a cover (not shown), which includes light-generating and light-receiving devices (not shown) associated with both device 45 and 46. The light-generating and light-receiving devices are configured according to the techniques described in connection with, and illustrated in, FIGS. 2, 3 and 4. An interface board 32 facilitates communication between devices 45 and 46, and between devices 45 and 46 and external devices (not shown), by receiving, at light-receiving devices 16, optical signals from the light-generating devices disposed in housing 10, and by transmitting, by light-generating devices 14, optical signals to the light-receiving devices disposed in housing 10. It may also be desirable to hardwire the communication links between devices 45 and 46, because these devices are both located in housing 10.

Figure 6:
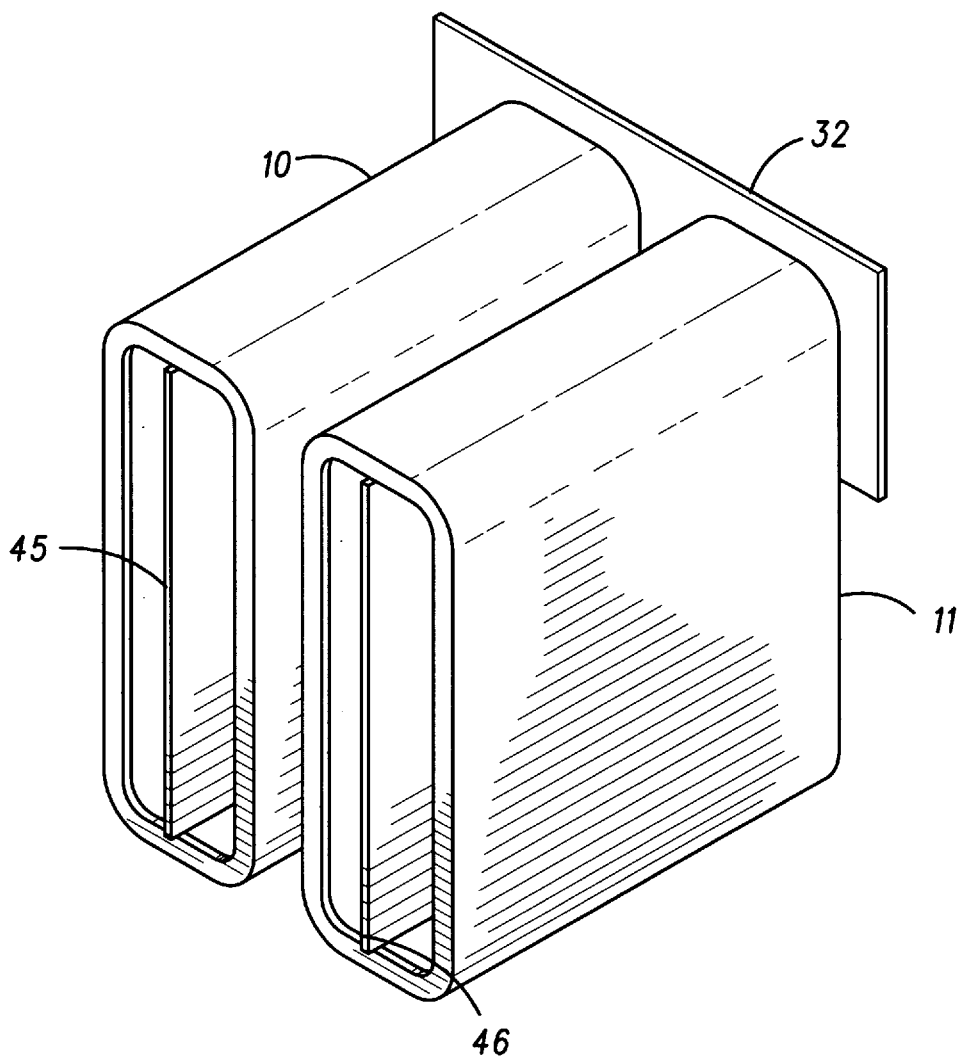
FIG. 6 is a perspective view of two fluid-sealed housings enclosing electronic devices which are interconnected by the central interface shown in FIG. 4.

FIG. 6 is a perspective view of two fluid-sealed housings 10 and 11 enclosing spray-cooled electronic devices 45 and 46, respectively. Housings 10 and 11 each have covers (not shown) which include light-generating and light-receiving devices (not shown). The light-generating and light-receiving devices are configured according to the techniques described in connection with, and illustrated in, FIGS. 2, 3 and 4. An interface board facilitates communication between devices 45 and 46 and other external devices (not shown) as described in connection with FIG. 5.

Figure 7:
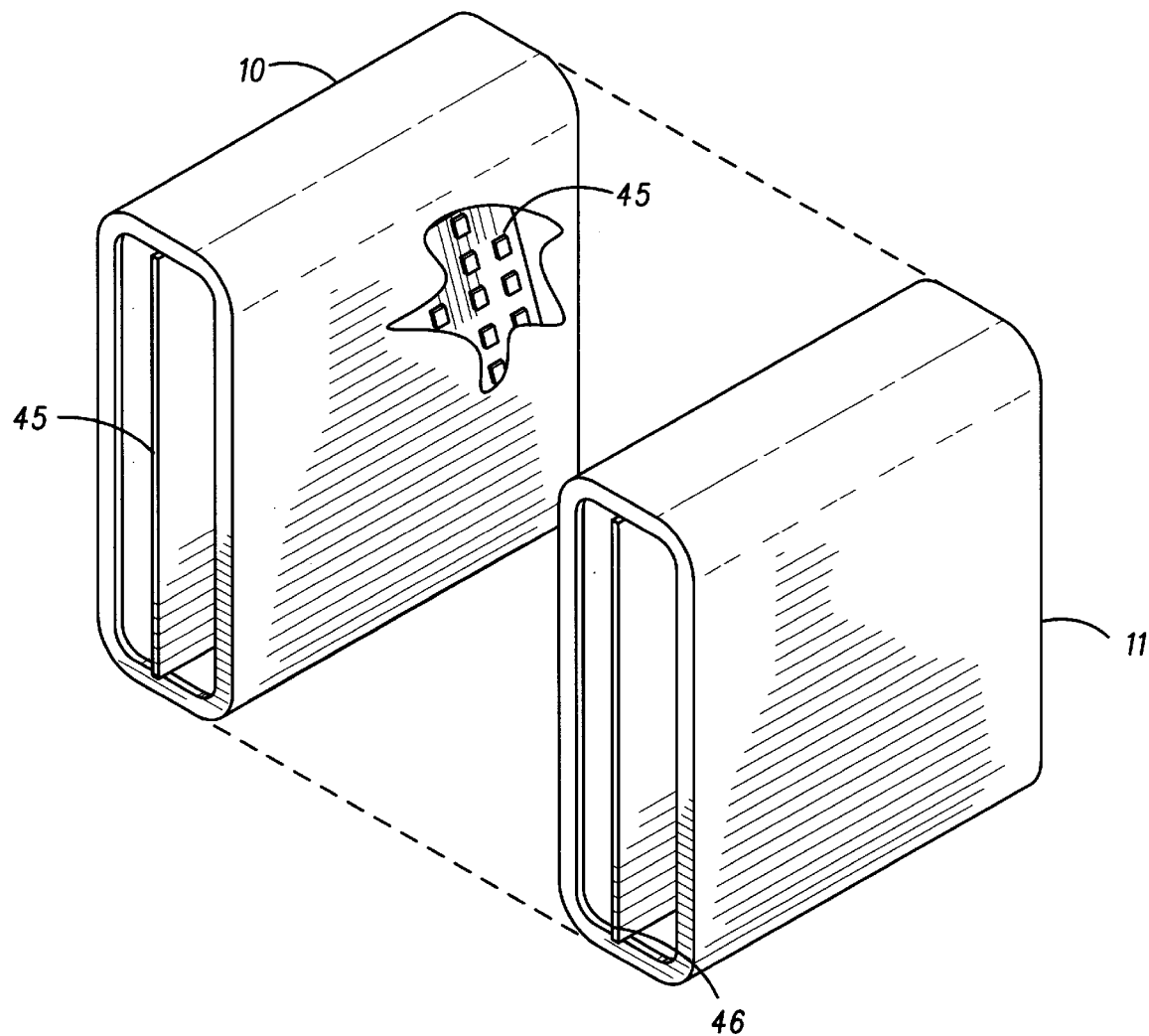
FIG. 7 is a perspective of two fluid-sealed housings enclosing electronic devices which are interconnected in a line-of-sight fashion.

FIG. 7 is a perspective of two fluid-sealed housings 10 and 11 enclosing spray-cooled electronic devices 45 and 46, respectively. Housings 10 and 11 have portions which include light-generating and light-receiving devices (not shown), configured according to the techniques described in connection with, and illustrated in, FIGS. 2, 3 and 4. The light-generating devices in housing 10 are preferably aligned in a line-of-sight fashion with the light-receiving devices in housing 11, and vice versa. In this manner, it is possible for electronic devices 45 and 46 to communicate between housings 10 and 11 without using a common interface board.

Figure 8:
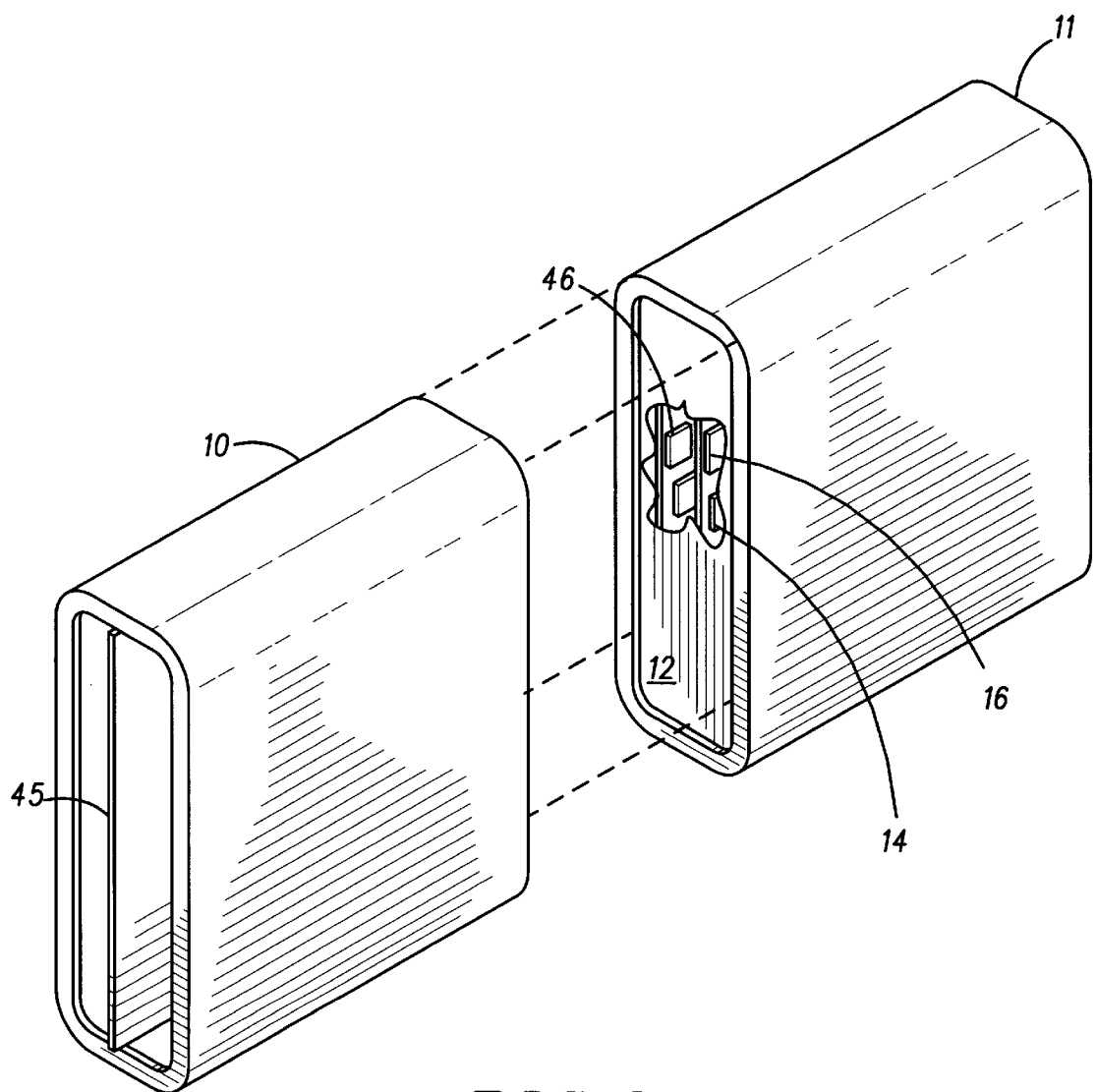
FIG. 8 is another perspective view of two fluid-sealed housings enclosing electronic devices which are interconnected in a line-of-sight fashion.

FIG. 8 is another perspective view of two fluid-sealed housings 10 and 11 enclosing spray-cooled electronic devices 45 and 46, respectively. Housings 10 and 11 have covers 12 which include light-generating and light-receiving devices configured according to the techniques described in connection with, and illustrated in, FIGS. 2, 3 and 4 (light-generating devices 14 and light-receiving devices 16 are visible in cover 12 associated with housing 11). Light-generating devices 14 in housing 11 are preferably aligned in a line-of-sight fashion with the light-receiving devices in housing 10, and vice versa. In this manner, it is possible for electronic devices 45 and 46 to communicate between housings 10 and 11 without using a common interface board.

The apparatuses and methods described herein result in a well-sealed housing which allows for communication by and between electronic devices while substantially reducing fluid loss in a fluid-cooled system such as a spray-cooled system. Since interconnection of electronic devices is not accomplished mechanically, there are no delicate conductors which may protrude and be damaged in shipping or handling in the factory or in the field.

It is contemplated that an entire housing, or any portion thereof, may be transparent, and that light-generating and light-receiving devices may be disposed in or about any portion of the housing. It is also contemplated that the embodiments of the present invention described herein are not limited to use in a fluid-cooled system, but may be used in any system where communication between electronic modules is desirable.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

We claim:

1. An apparatus for communication by an electronic device, comprising:
    a first housing defining a first chamber, the first chamber sized to enclose at least a portion of an electronic device, the first housing having an inner surface and an outer surface, at least a portion of the first housing being transparent; and
    a light-generating device disposed at least in part between the inner surface and the outer surface of the transparent portion of the first housing, the light-generating device having a first end and a second end, the first end responsive to electrical signals and the second end responsive to optical signals,
    wherein when a first electronic device is disposed at least partially in the first chamber, the first electronic device is in contact with a cooling fluid and the first electronic device transmits electrical signals to the first end, and wherein the second end translates the electrical signals to optical signals and transmits the optical signals through the outer surface.

2. The apparatus according to claim 1, wherein the light-generating device comprises a semiconductor laser.

3. The apparatus according to claim 1, wherein the first end comprises a conductor.

4. The apparatus according to claim 1, further comprising:
    a second housing defining a second chamber, the second chamber sized to enclose an electronic device, at least a portion of the second housing being transparent, wherein when a second electronic device is disposed in the second chamber, the second electronic device is responsive to the optical signals.

5. The apparatus according to claim 1, further comprising:
    an interface board responsive to the optical signals.

6. The apparatus according to claim 1, wherein the first housing comprises plastic.

7. The apparatus according to claim 1, wherein the light-generating device is insertion-molded into the first housing.

8. A method for communicating between electronic devices, comprising the steps of:
    providing a housing defining a chamber, the housing having an inner surface and an outer surface, at least a portion of the housing being transparent;
    disposing a first electronic device and a second electronic device in the chamber;
    disposing a light-generating device at least partially between the inner surface and the outer surface of the transparent portion of the housing, the light-generating device having a first end and a second end, the first end responsive to electrical signals and the second end responsive to optical signals;
    providing an interface board responsive to the light-generating device, the interface board in communication with the transparent portion of the housing;

transmitting, by the first electronic device, electrical signals to the first end;

translating the electrical signals to optical signals;

transmitting the optical signals through the outer surface to the interface board;

communicating via the interface board with the second electronic device; and using a fluid, cooling the first electronic device and the second electronic device.

9. A method for communicating between electronic devices, comprising the steps of:

providing a first housing defining a first chamber, the first housing having an inner surface and an outer surface, at least a portion of the first housing being transparent;

disposing a first electronic device in the first chamber;

disposing a light-generating device at least partially between the inner surface and the outer surface of the transparent portion of the first housing, the light-generating device having a first end and a second end, the first end responsive to electrical signals and the second end responsive to optical signals;

providing a second housing defining a second chamber, at least a portion of the second housing being transparent;

disposing a second electronic device in the second chamber;

communicating, via the light-generating device, between the first and second electronic devices; and using a fluid, cooling the first electronic device.

10. The method according to claim 9, further comprising the step of:

providing an interface board in communication with the transparent portions of the first and second housings, the interface board responsive to the light-generating device.

11. The method according to claim 10, wherein the step of communicating further comprises the steps of:

transmitting, by the first electronic device, electrical signals to the first end;

translating the electrical signals to optical signals;

transmitting the optical signals through the outer surface to the interface board; and communicating via the interface board with the second electronic device.

12. The method according to claim 9, further comprising the step of:

providing a light-receiving device in the transparent portion of the second housing, the second electronic device responsive to the light-receiving device.

13. The method according to claim 12, wherein the step of communicating further comprises the steps of:

disposing the transparent portion of the first housing adjacent the transparent portion of the second housing;

transmitting, by the first electronic device, electrical signals to the first end;

translating the electrical signals to optical signals; and transmitting the optical signals through the outer surface of the first housing to the light-receiving device.

14. An apparatus for communication by an electronic device, comprising:

a housing defining a chamber, the chamber sized to enclose at least a portion of an electronic device, the housing having an inner surface and an outer surface, at least a portion of the housing being transparent; and a light-generating device disposed in the housing, the light-generating device having a first end and a second end, the first end responsive to electrical signals and the second end responsive to optical signals, wherein when the electronic device is disposed at least partially in the chamber, heat is transferred from the electronic device to a cooling fluid and the electronic device transmits electrical signals to the first end, and wherein the second end translates the electrical signals to optical signals and transmits the optical signals through the outer surface.

* * * * *